(12) United States Patent
Chang et al.

(10) Patent No.: US 11,394,059 B2
(45) Date of Patent: *Jul. 19, 2022

(54) SECONDARY BATTERY AND ACTIVE MATERIAL

(71) Applicant: L&F Co., Ltd., Daegu (KR)

(72) Inventors: Sung Kyun Chang, Daegu (KR); Sang Hoon Jeon, Daegu (KR); Jun Ho Shin, Daegu (KR); Ji Woo Oh, Daegu (KR); Hee Won Jung, Daegu (KR); Hye-Rim Bae, Daegu (KR); Chang Hyun Lee, Daegu (KR); Doe Hyoung Kim, Daegu (KR)

(73) Assignee: L&F CO., LTD., Daegu (KR)

( * ) Notice: Subject to any disclaimer, the term of this patent is extended or adjusted under 35 U.S.C. 154(b) by 270 days.

This patent is subject to a terminal disclaimer.

(21) Appl. No.: 16/660,514

(22) Filed: Oct. 22, 2019

(65) Prior Publication Data

US 2020/0144680 A1    May 7, 2020

(30) Foreign Application Priority Data

Oct. 23, 2018 (KR) .................. 10-2018-0126491

(51) Int. Cl.
*H01M 10/42* (2006.01)
*H01M 4/485* (2010.01)
(Continued)

(52) U.S. Cl.
CPC ....... *H01M 10/4235* (2013.01); *H01M 4/485* (2013.01); *H01M 4/628* (2013.01);
(Continued)

(58) Field of Classification Search
CPC ...... H01M 4/363; H01M 4/366; H01M 4/131; H01M 10/654; H01M 10/6595;
(Continued)

(56) References Cited

U.S. PATENT DOCUMENTS

2016/0181611 A1* 6/2016 Cho .................. H01M 4/525
429/221
2016/0181661 A1   6/2016 Dubois et al.
2016/0233474 A1* 8/2016 Kagami ................ B60L 3/04

FOREIGN PATENT DOCUMENTS

EP   0944126 A1 *  9/1999 ........ H01M 10/4235
EP   0944126 A1    9/1999
(Continued)

OTHER PUBLICATIONS

Machine Translation of JP 2015219999 (Year: 2015).*
(Continued)

*Primary Examiner* — Matthew T Martin
*Assistant Examiner* — Ankith R Sripathi
(74) *Attorney, Agent, or Firm* — Ladas & Parry, LLP

(57) ABSTRACT

Disclosed is a secondary battery including a positive electrode, a negative electrode and an electrolyte, wherein the secondary battery further includes a reaction-inducing substance located in any one of the positive electrode, the negative electrode and the electrolyte, wherein the reaction-inducing substance forms a reaction product when exposed to a predetermined temperature or higher in a use environment of the secondary battery, wherein the reaction product is a non-conductor.

12 Claims, 10 Drawing Sheets

(51) Int. Cl.
  *H01M 4/62* (2006.01)
  *H01M 50/581* (2021.01)
  *H01M 10/0525* (2010.01)

(52) U.S. Cl.
  CPC ...... *H01M 50/581* (2021.01); *H01M 10/0525* (2013.01); *H01M 2200/10* (2013.01)

(58) Field of Classification Search
  CPC .... H01M 4/62; H01M 4/628; H01M 10/4242; H01M 4/525
  See application file for complete search history.

(56) References Cited

FOREIGN PATENT DOCUMENTS

| | | | | |
|---|---|---|---|---|
| JP | 2015219999 | * | 12/2015 | ............. H01G 11/30 |
| JP | 2015219999 A | | 12/2015 | |
| KR | 20160083227 A | | 7/2016 | |
| KR | 20160123164 A | | 10/2016 | |

OTHER PUBLICATIONS

Kyosuke Oshima et al. 2004 J. Electrochem. Soc. 151 G257 (Year: 2004).*
Non-Final Office Action from U.S. Appl. No. 16/660,507, dated Sep. 27, 2021, all pages.

* cited by examiner

[FIG. 1a]
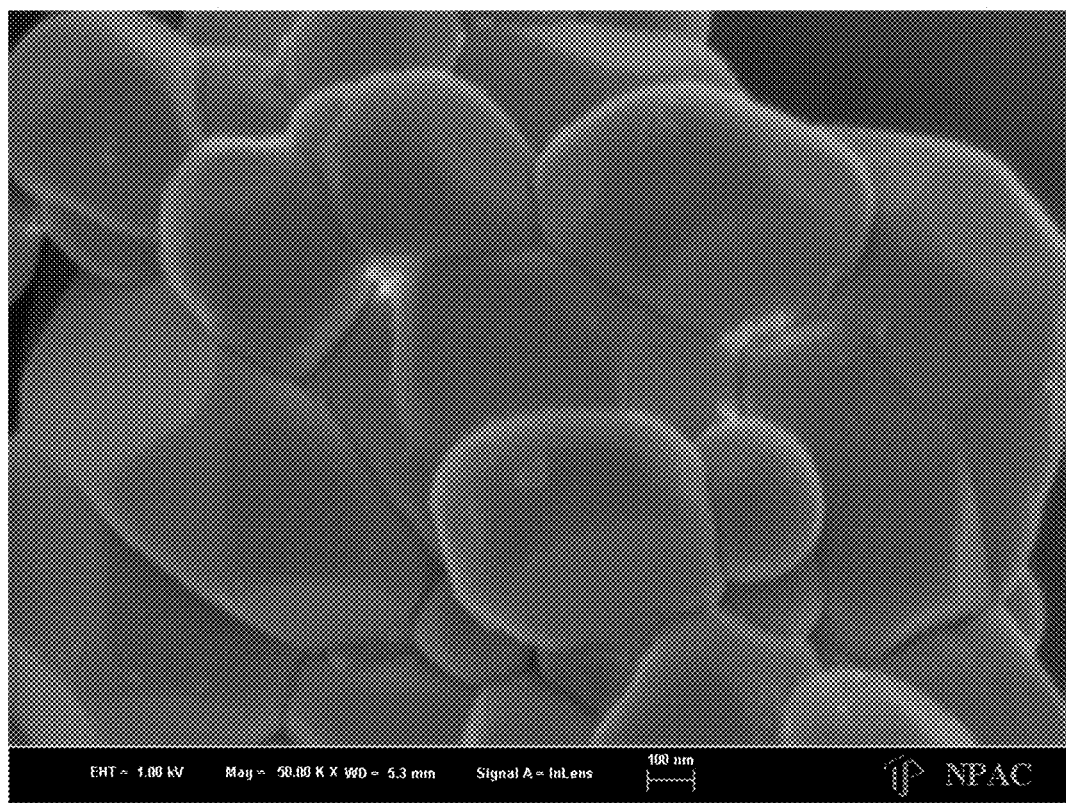

[FIG. 1b]
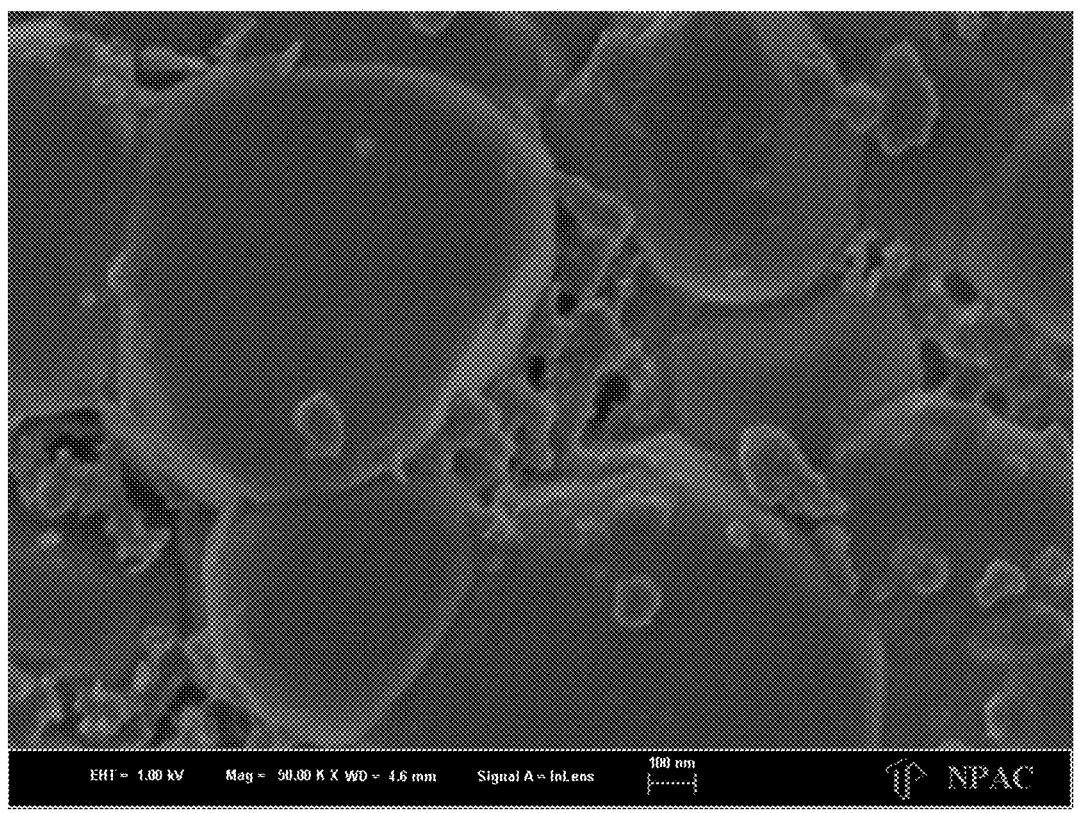

[FIG. 1c]
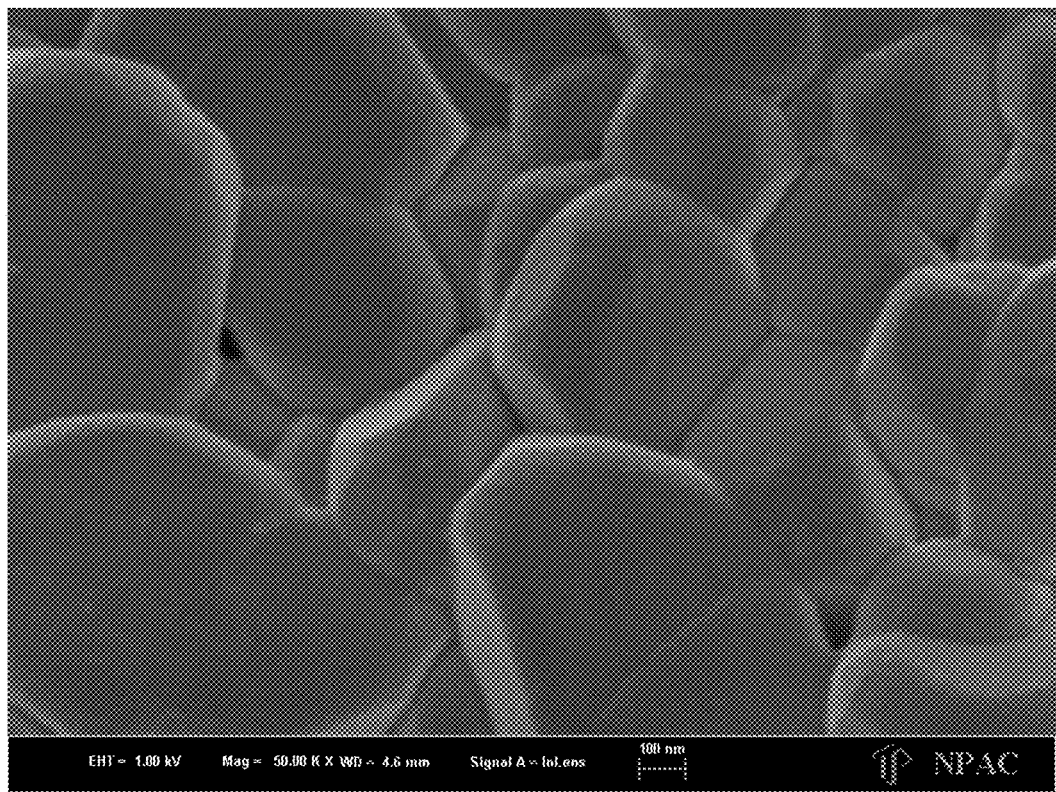

[FIG. 2a]
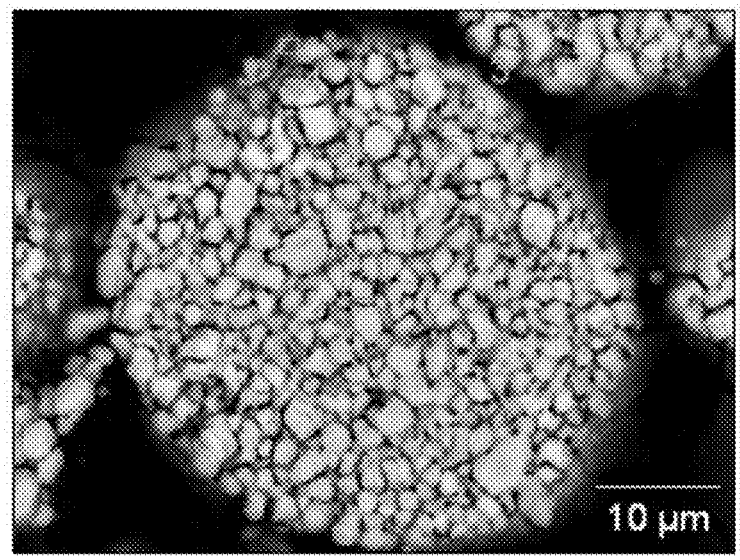
| | O-K | Si-K | Mn-K | Co-L | Ni-L |
|---|---|---|---|---|---|
| 118-CROSS(1)_pt1 | 29.39 | 0.00 | 17.68 | 19.87 | 33.06 |
| 118-CROSS(1)_pt2 | 29.80 | 0.00 | 17.26 | 16.81 | 36.13 |
| 118-CROSS(1)_pt3 | 28.36 | 0.03 | 16.84 | 19.74 | 35.03 |
| 118-CROSS(1)_pt4 | 12.02 | 1.08 | 20.67 | 21.80 | 44.43 |

[FIG. 2b]
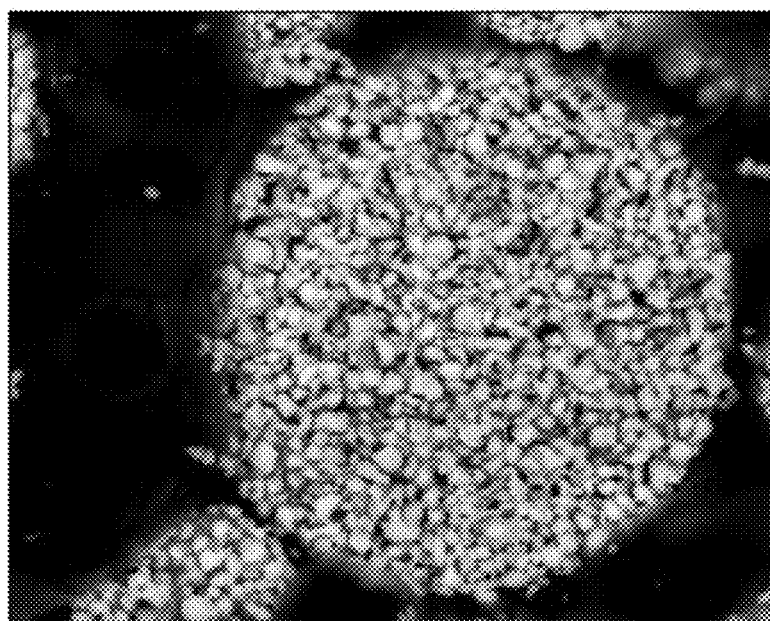
|  | O-K | Si-K | Mn-K | Co-L | Ni-L |
|---|---|---|---|---|---|
| 003-RE(3)_pt1 | 28.82 | 0.01 | 21.29 | 15.52 | 34.35 |
| 003-RE(3)_pt2 | 31.24 | 0.22 | 16.57 | 15.19 | 36.78 |
| 003-RE(3)_pt3 | 30.22 | 0.28 | 18.72 | 14.86 | 35.92 |
| 003-RE(3)_pt4 | 28.17 | 0.07 | 18.85 | 19.79 | 33.12 |

[FIG. 3a]
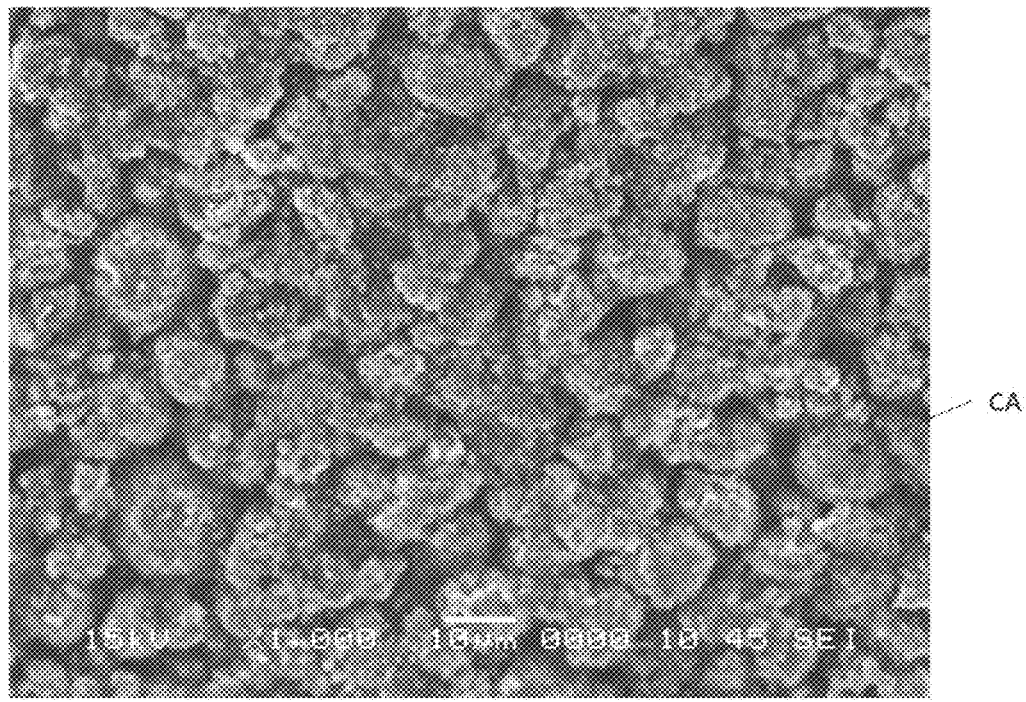
[FIG. 3b]
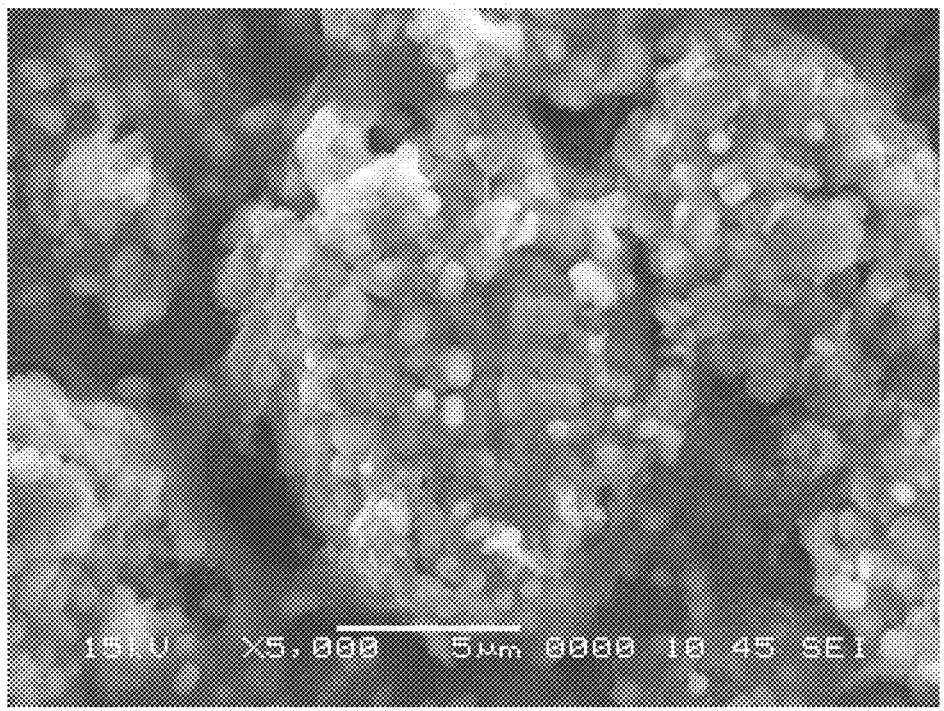

[FIG. 3c]
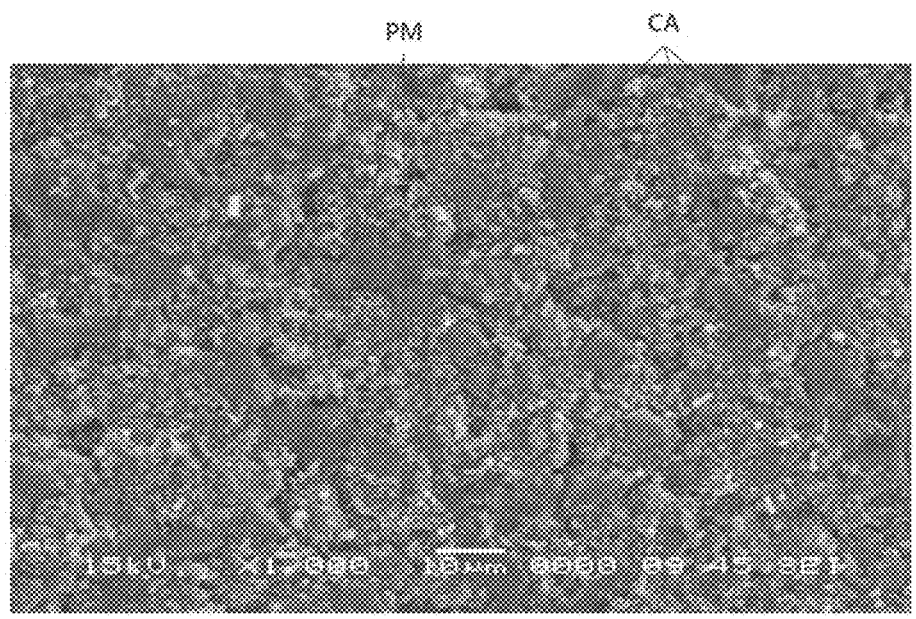
[FIG. 3d]
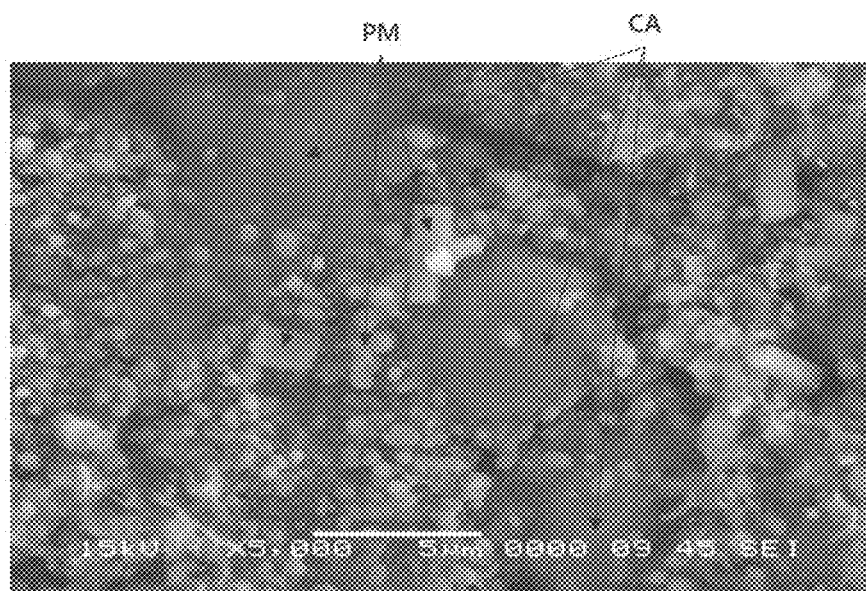

[FIG. 3e]
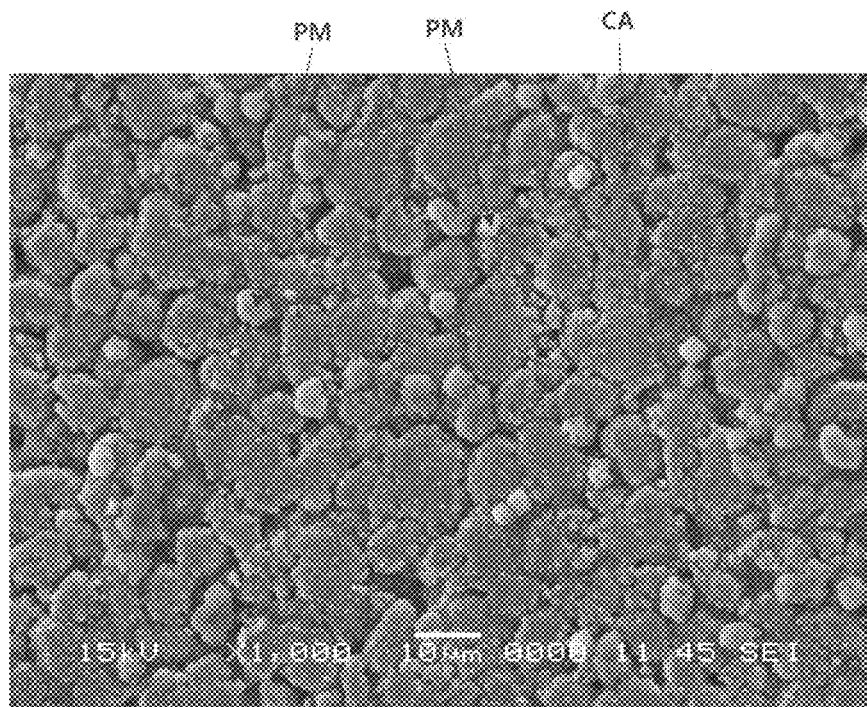
[FIG. 3f]
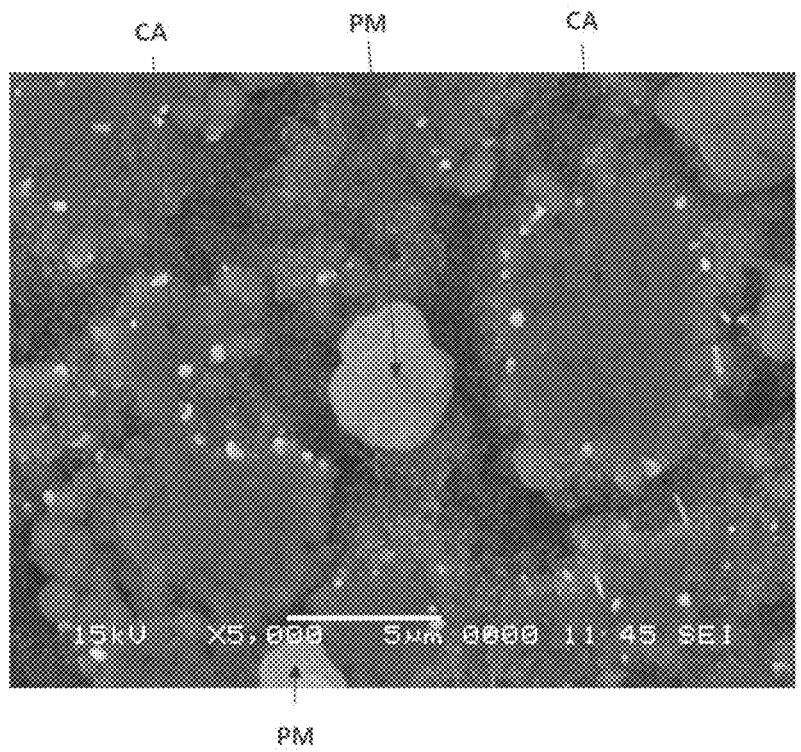

[FIG. 4a]
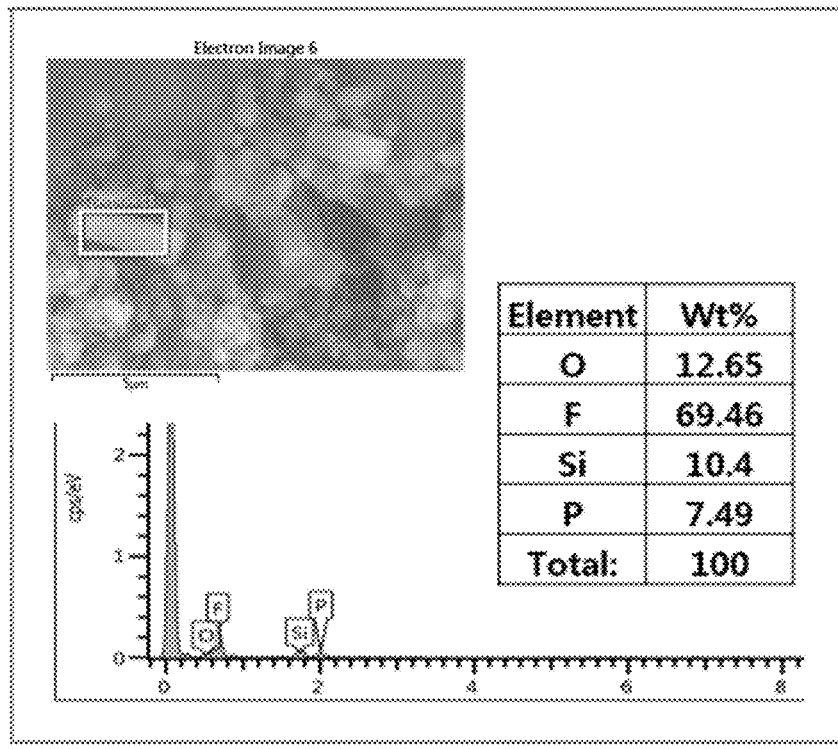
[FIG. 4b]
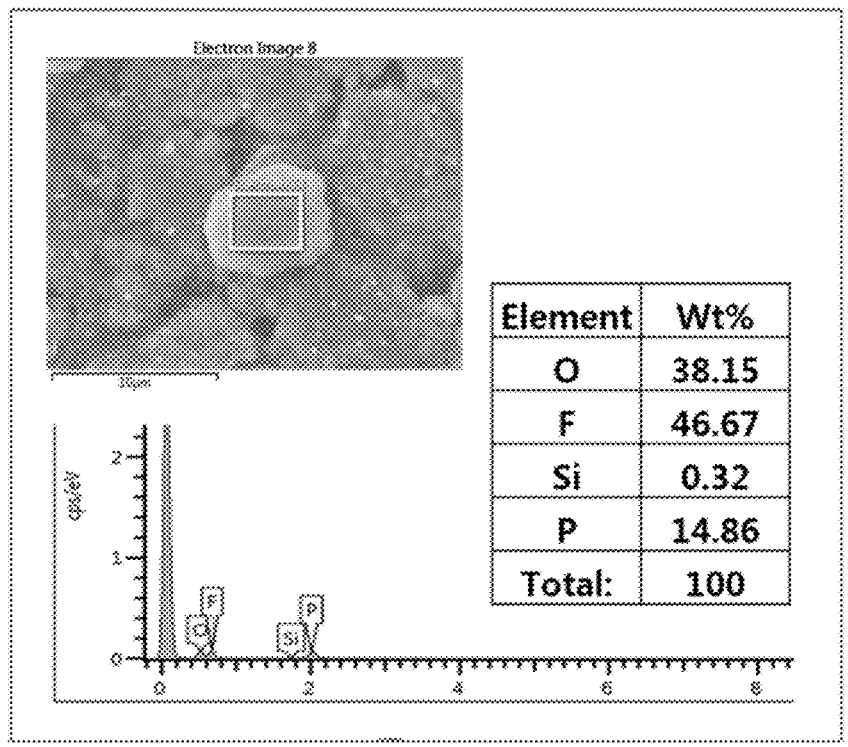

[FIG. 5]
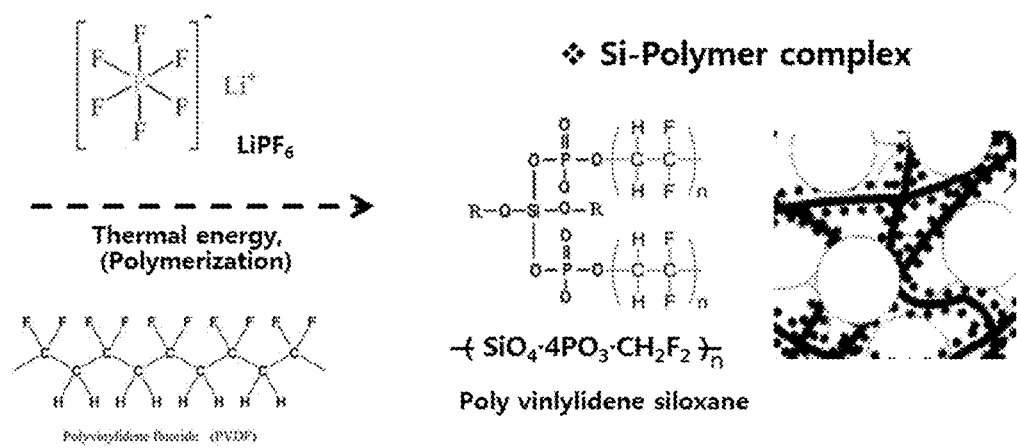

SECONDARY BATTERY AND ACTIVE MATERIAL

CROSS-REFERENCE TO RELATED APPLICATION

The present application claims priority to South Korean Patent Application No. 10-2018-0126491 filed on Oct. 23, 2018, the disclosure of which is incorporated herein by reference in its entirety.

TECHNICAL FIELD

The present invention relates to a secondary battery and an active material.

BACKGROUND ART

In accordance with policies to reduce fossil fuel consumption and $CO_2$ emissions, the development of eco-friendly electric vehicles is actively underway, and lithium secondary batteries, which are considered to be a key component thereof, are also being rapidly developed. Conventional lithium secondary batteries were limited to small products such as mobile devices, but recently have come to be widely applied to medium- and large-sized products such as electric vehicles.

In order for the lithium secondary battery to be applied in a wider range of fields, it is necessary to secure higher safety than at present, and many methods therefor have been suggested.

The condition of the lithium secondary batteries is measured in real time depending on the field of application, in order to prevent safety accidents such as ignition and explosion of the battery through a hardware-type safety device, but this method is limited in that it cannot overcome the fundamental cause of safety accidents.

Conventionally, a method for coating a positive electrode/negative electrode material or an electrode plate with a nonconductive polymer material in order to improve the safety of lithium secondary batteries is known, but such a method has not been widely applied due to disadvantages in that the nonconductive polymer material, present from the initial state of manufacturing lithium secondary batteries, causes deterioration in the basic characteristics of the batteries, such as increasing the resistance of batteries and lowering the output thereof.

DISCLOSURE

Technical Problem

Therefore, the present invention has been made to solve the above and other technical problems that have yet to be resolved. The present inventors have developed technology capable of effectively controlling the occurrence of ignition and/or explosion in an unexpected high-temperature environment without deteriorating the characteristics of lithium secondary batteries.

More specifically, it is an object of the present invention to provide a secondary battery with high safety and an active material that can improve thermal safety by forming a reaction product as a non-conductor to shut down the secondary battery when the secondary battery is exposed to high temperatures due to internal or external factors of the secondary battery during use of the secondary battery.

Technical Solution

In accordance with one aspect of the present invention, provided is a secondary battery including a positive electrode, a negative electrode and an electrolyte, wherein the secondary battery further includes a reaction-inducing substance located in any one of the positive electrode, the negative electrode and the electrolyte, wherein the reaction-inducing substance forms a reaction product when exposed to a predetermined temperature or higher in a use environment of the secondary battery, wherein the reaction product is a non-conductor.

In accordance with one aspect of the present invention, provided is an active material including a lithium metal oxide and a reaction-inducing substance, wherein the reaction-inducing substance forms a reaction product when exposed to a predetermined temperature or higher in a use environment of a secondary battery, wherein the reaction product is a non-conductor.

Effects of the Invention

The secondary battery according to an embodiment of the present invention improves thermal safety by naturally forming a reaction product as a non-conductor and inhibiting thermal runaway due to the shut-down of the secondary battery when exposed to high temperatures in the use environment thereof.

In addition, the reaction product as the non-conductor is not generated when the secondary battery is in a normal operation state and is generated when the secondary battery is in an abnormal high-temperature state due to an internal factor of the secondary battery or when the secondary battery is exposed to a high-temperature environment due to external factors. Since no reaction product is present in the normal operation state, the basic characteristics of the secondary battery are not deteriorated.

Accordingly, it is possible to realize a lithium secondary battery having a high capacity, excellent thermal safety and superior life characteristics at high temperatures as well as at room temperature.

BRIEF DESCRIPTION OF THE DRAWINGS

FIG. 1a is an SEM image showing a non-coated bare state in Comparative Example 1;

FIG. 1b is an SEM image showing the state in which $Si_zO_a$ particles (agglomerates) are present between primary particles rather than being uniformly coated due to a low firing temperature (400° C.) in Comparative Example 3;

FIG. 1c is an SEM image showing a uniformly coated state due to a high firing temperature (940° C.) in Example 1;

FIG. 2a is EDX data obtained by analyzing the cross-sections of active material particles in Comparative Example 3;

FIG. 2b is EDX data obtained by analyzing the cross-sections of the active material particles in Example 1;

FIG. 3a is an SEM image (X 1,000) showing the state of a positive electrode active material not including a reaction-inducing substance of Comparative Example 1 at a temperature of 300° C.;

FIG. 3b is an SEM image (X 5,000) showing the state of a positive electrode active material not including a reaction-inducing substance of Comparative Example 1 at a temperature of 300° C.;

FIG. 3c is an SEM image (X 1,000) showing the state of a positive electrode active material including a reaction-inducing substance of Example 1 at a temperature of 300° C.;

FIG. 3d is an SEM image (X 5,000) showing the state of a positive electrode active material including a reaction-inducing substance of Example 1 at a temperature of 300° C.;

FIG. 3e is an SEM image (X 1,000) showing the state of the positive electrode active material including the reaction-inducing substance of Example 1 at a temperature of 380° C.;

FIG. 3f is an SEM image (X 5,000) showing the state of the positive electrode active material including the reaction-inducing substance of Example 1 at a temperature of 380° C.;

FIG. 4a is EDS data obtained by analyzing the components of a polymer formed at 300° C. for the positive electrode active material of Example 1;

FIG. 4b is EDS data obtained by analyzing the components of the polymer formed at 380° C. for the positive electrode active material of Example 1; and FIG. 5 is a diagram showing an expected mechanism of polymerization according to an embodiment of the present invention.

BEST MODE

Hereinafter, the present invention will be described in detail with reference to several preferred embodiments such that the present invention can be easily implemented by those skilled in the technical field to which the present invention pertains. However, the present invention may be embodied in different forms and is not limited to the embodiments described herein.

In addition, it will be understood that when a part is referred to as "comprise (include)" an element, other one or more elements may also be present, rather than being precluded, unless otherwise stated.

Hereinafter, a secondary battery and an active material according to an embodiment of the present invention will be described in detail.

Secondary Battery

In one embodiment of the present invention, provided is a secondary battery including a positive electrode, a negative electrode and an electrolyte, and further including a reaction-inducing substance located in any one of the positive electrode, the negative electrode and the electrolyte, wherein the reaction-inducing substance forms a reaction product when exposed to a predetermined temperature or higher in a use environment of a secondary battery, wherein the reaction product is a non-conductor.

As long as the effect of the present invention is achieved, the reaction-inducing substance may be applied to other parts of the secondary battery, for example, to a separator or the like.

In one embodiment, the reaction-inducing substance may form the reaction product by reacting with at least one of an electrolyte and a binder in a secondary battery. Specifically, the reaction mechanism whereby the reaction-inducing substance forms a reaction product as a non-conductor may vary. For example, it may be carried out through a reaction with an electrolyte, a binder, or the like, among the components constituting the secondary battery.

The reaction product of the non-conductor may act as a kind of resistor in the secondary battery, and such a resistor may not only inhibit electrical conduction in the secondary battery but also inhibit metabolism to thereby induce shutdown of the secondary battery.

Specifically, when the secondary battery is in an abnormal operating state such as overcharge, overdischarge or overcurrent during charging and discharging thereof, a kind of thermal runaway may occur. In this regard, the reaction product as a non-conductor acts as a resistor against electrical conduction and metabolism to block the further occurrence of charging and discharging to thereby stop the operation of the secondary battery and prevent thermal runaway.

In addition, when the secondary battery is in a high-temperature state, structural collapse of the positive electrode active material, melting of a separator, and decomposition of an electrolyte may be caused, and thus an internal short, an exothermic reaction or the like may proceed rapidly. The reaction product as a non-conductor acts as a kind of thermal resistor to inhibit rapid progression through suppression of heat conduction.

As the temperature increases, the size of the reaction product may increase. For example, the volume, weight, degree of polymerization and the like may increase when the reaction product is a compound or a polymer. As the size of the reaction product increases, the roles of the resistor described above may be further strengthened.

This can be seen from the embodiments described below, and as can be seen from FIG. 3, the volume of the reaction product formed by heating to 380° C. is larger than the reaction product formed by heating to 300° C. when analyzed with a scanning electron microscope.

In addition, the reaction product is detected when the secondary battery is heated to 300° C. and then taken apart (or is taken apart and then heated thereto), and is observed with a scanning electron microscope. Alternatively, the reaction product may be detected even when the secondary battery is heated to 380° C. and then taken apart (or is taken apart and then heated thereto) and is observed with a scanning electron microscope.

The detection of the reaction product after heating to 300° C. and 380° C. does not mean that the reaction product begins to be observed from that temperature, but means that the reaction product is formed at a lower temperature and is then continuously observed at that temperature. The temperature at which the reaction product begins to form depends on the kind of core of the active material and the kind of reaction-inducing substance, binder, electrolyte and the like.

As such, the exact temperature at which the reaction product begins to form depends on a variety of factors. The reaction product is continuously formed, rather than being burned out, even at a high temperature where the secondary battery is placed in a dangerous state, thereby effectively performing the role of the resistor. The reaction product according to one embodiment of the present invention is not present from the beginning, but is formed when exposed to an environment above a certain temperature when applied to the secondary battery.

That is, in the secondary battery according to the present invention, the reaction product is formed when a high temperature is induced due to internal factors of the secondary battery or when the secondary battery is exposed to a high temperature due to external factors thereof in a charge/discharge mode or a standby mode in the use environment of the secondary battery, that is, the environment in which the completed secondary battery is used, and the reaction product serves as a kind of resistor in terms of electrical, thermal and metabolism aspects, thereby greatly improving the thermal safety of the secondary battery.

Meanwhile, the reaction-inducing substance which forms the reaction product at high temperatures does not affect the operation of the secondary battery.

Therefore, it is possible to avoid problems including increased resistance and lowered output of the secondary battery by coating a polymer material or the like to realize thermal safety in conventional technologies.

In one embodiment, the reaction-inducing substance may include a compound represented by Formula 1 below:

$$Li_xM_ySi_{z-y}O_{a-b}A_b \quad (1)$$

wherein $0 \leq x \leq 4$, $0 \leq y < 1$, $0 < z \leq 1$, $y < z$, $0 \leq a \leq 4$, $0 \leq b \leq 4$, and $b < a$, M is at least one of Ni, Mn, Co or Al, and A is at least one of Cl or F.

In one specific example, the reaction-inducing substance may be a substance including Li and Si, that is, a compound satisfying the condition $0 < x \leq 4$ and $0 < z \leq 1$.

In another specific example, the reaction-inducing substance may include both $SiO_2$ and the compound of Formula 1, and a molar ratio of $[SiO_2]/[$compound of Formula 1$]$ may be 0.8 or less. That is, the content of $SiO_2$ that requires a reaction at a high temperature is preferably lower.

In one embodiment, the reaction product may be a polymer, and the polymer may include at least one of Si, P, O, or F. This will be described in more detail in connection with the following examples. At this time, the components may vary depending on the kinds of the reaction-inducing substance, the electrolyte and the binder, and in one specific example, the reaction product may include all of Si, P, O and F.

The polymer may satisfy $100 \leq Mn \leq 10,000$ and $100 \leq Mw \leq 10,000$. This may be controlled according to the polymerization reaction of the polymer in consideration of the high-temperature environment of the secondary battery. When a higher level of thermal safety is desired, it can be controlled within various ranges.

Active Material

In one embodiment of the present invention, provided is an active material including a lithium metal oxide and a reaction-inducing substance, wherein the reaction-inducing substance forms a reaction product as a non-conductor when exposed to a predetermined temperature or higher in a use environment of a secondary battery, thereby improving the thermal safety of the secondary battery.

The description of the reaction-inducing substance will be the same as the description of one embodiment of the present invention described above and thus is omitted.

In one specific example, the reaction-inducing substance may be located on the surface of lithium metal oxide.

In another specific example, the lithium metal oxide may be in the form of primary particles and secondary particles including the primary particles, wherein the reaction-inducing substance may be present inside and/or on the surface of the secondary particles.

Specifically, the active material may be a positive electrode active material, and the positive electrode active material may be any one of various materials such as NCM-, NCA- and LCO-based active materials.

Although the reaction-inducing substance may be located only on the surface of the secondary particles in the core material, it is preferably located on the surface of the primary particles as well.

That is, the reaction-inducing substance may also be located between the agglomerated primary particles (at the grain boundaries) constituting the secondary particles. In this case, a better effect is expected. The reason for this is that it is expected that the non-conducting reaction product can act more effectively as an electrical and thermal resistor when the reaction-inducing substance located between the primary particles is converted into a non-conducting reaction product in a high-temperature environment.

In this regard, upon EDX analysis of any 20 or more pores, in the cross-section of the secondary particles, Si may be detected in 50% or more of analyzed pores (based on 100% of the total number of pores analyzed).

The lithium metal oxide may include a compound represented by Formula 2 below.

$$Li_{1+k}[M1_{1-\alpha}M2_\alpha]O_{2-\beta}Q_\beta \quad (2)$$

wherein M1 is $Ni_xCo_yMn_z$, M2 is Ti, Zr, Mg, M3 or a combination thereof, wherein M3 includes at least one of an alkaline earth metal, an alkali metal, a Group 3 to 12 metal element and a Group 13 to 15 element, Q includes at least one of F, P and S, and $-0.1 \leq k \leq 0.1$, $0.0007 \leq \alpha \leq 0.05$, $0 \leq \beta \leq 0.1$, $0 \leq x \leq 1$, $0 \leq y \leq 1$, $0 \leq z \leq 1$.

In Formula 2, k may be −0.1 or more and 0.1 or less as defined above. Therefore, the molar ratio of Li may be 0.9 or more and 1.1 or less. When the molar ratio of Li is less than 0.9, a transition metal, for example, Ni, is readily incorporated into the Li phase, and the metal site occupancy ratio of the lithium site increases, making it difficult to obtain an Li—Ni composite oxide capable of realizing a high-capacity battery. In addition, when the molar ratio of Li is larger than 1.1, incorporation of Li into the metal site increases, and Ni separated from the metal site is incorporated into the Li phase and the metal occupancy ratio of the lithium site increases. Therefore, k is preferably in the range defined above, and more specifically may be in the range $0 \leq k \leq 0.05$.

Next, M1 in Formula 2 may be a nickel-based lithium metal oxide having a layered structure, that is, $Ni_xCo_yMn_z$, as defined above.

In one preferred example, the requirements of $0.4 \leq x \leq 1$, $0 \leq y \leq 0.3$ and $0 \leq z \leq 0.3$ may be satisfied, and such a nickel-based lithium metal oxide may include Co and Mn. In this case, y and z, which are the content ratios of Co and Mn, may satisfy $0.05 \leq y \leq 0.2$ and $0.05 \leq z \leq 0.3$, and when the molar ratio of Co and Mn satisfies the ranges defined above, the structural stability of the positive electrode active material capable of realizing a high capacity can be improved.

Regarding the dopant, first, M2 may include a plurality of dopants, and may further include M3 as needed. That is, M2 may be represented by $Ti_aZr_bMg_cM_d$. α, which is the total molar ratio of M2, i.e., a+b+c+d, may range from $0.0007 \leq \alpha \leq 0.05$, more specifically $0.005 \leq \alpha \leq 0.03$ or $0.008 \leq \alpha \leq 0.04$.

When three types of dopants represented by M2 as the dopants in the positive electrode active material, that is, Ti, Zr, and Mg, are present in the above ratio, structural and surface stability of the positive electrode active material can be improved.

In Formula 2 of the present embodiment, M3 as a dopant excluding M1 and M2 may include at least one of an alkaline earth metal, an alkali metal, a Group 3 to 12 metal element and a Group 13 to 15 element. For example, M3 may include at least one of Al, B, P, S, Mo, V, W, Ca, Na, Zn, Cr, Fe, Cu, Ru, Sr, Be, Si, Ge, Ba, K, Sr, Hf, Ta, Ga, Os, As and Sb, and more specifically, may include at least one of Al or B. Alternatively, M3 may include both Al and B.

In this case, in Formula 2, the molar ratio of Al may be in the range of $0.001 \leq Al \leq 0.01$, more specifically, $0.002 \leq Al \leq 0.01$. In addition, the molar ratio of B may be in the range of $0.0001 \leq B \leq 0.001$, more specifically, $0.0005 \leq B \leq 0.001$.

When Al is present in the above ratio, thermal and structural stabilization of the positive electrode active material according to the present embodiment is possible.

In addition, B is found to be related to the densification of the positive electrode active material particles, and when B is present within the above ratio, it is possible to strengthen the bond between the primary particles of the nickel-based lithium oxide described above to thus reduce internal voids and improve ionic conductivity.

Manufacturing Method of Positive Electrode Active Material

In one embodiment of the invention, provided is a method of producing a positive electrode active material including: mixing a metal precursor, a lithium raw material and a Si raw material, and then firing the resulting mixture; and obtaining lithium metal oxide particles containing a reaction-inducing substance, wherein a firing temperature in the step of firing is 800° C. or higher.

Examples of the Si raw material include, but are not limited to, $SiO_2$, $SiO$, $SiC$, $SiCl_2$, $SiCl_4$, $SiF_2$, $SiF_4$, $SiH_4$, $Si_2H_6$, $Si_3N_4$, $Si(CH_3)_4$, $Si(C_2H_5)_4$, $[SiO_x(OH)_{4-2x}]_n$ ($0 \leq x \leq 2$, $1 \leq n$), $(H_3O)_2SiF_6$ and the like.

The firing temperature in the step of firing may be 800 to 950° C.

When firing at a temperature of about 400° C. as in Comparative Example 3 described later, since the particles of $SiO_2$, which is the Si raw material, do not reach a temperature for reacting with a Li source, they are not converted into $Li_xM_ySi_zO_{a-b}A_b$. For this reason, the reaction-inducing substance is not formed normally but remains in the form of $Si_zO_a$ particles, and the polymer effect is not exhibited in an abnormal high-temperature environment.

When firing at a temperature of about 940° C. as in Examples 1 to 7, the Si raw material, $SiO_2$, reacts with the Li source to homogeneously form a reaction-inducing substance of $Li_xM_ySi_zO_{a-b}A_b$, and obtain the polymer effect in an abnormal high-temperature environment. However, a part of the trace amount of the reaction-inducing substance may include $Si_zO_a$ ($0 \leq z \leq 1$, $0 < a \leq 4$).

Lithium Secondary Battery

The positive electrode active material according to the embodiment described above may be useful for the positive electrode of a lithium secondary battery.

That is, the lithium secondary battery according to an embodiment of the present invention includes a negative electrode, a positive electrode including the positive electrode active material described above, and an electrolyte.

Specifically, the lithium secondary battery according to an embodiment of the present invention may include an electrode assembly including a positive electrode, a negative electrode and a separator disposed between the positive electrode and the negative electrode.

The negative electrode may be produced by mixing a negative electrode active material, a binder, and optionally a conductive material to prepare a composition for forming a negative electrode active material layer, and then applying the composition to a negative electrode current collector such as copper.

The negative electrode active material may be a material capable of intercalating/deintercalating lithium, and is, for example, a lithium metal, a lithium alloy, coke, artificial graphite, natural graphite, an organic polymer compound combustion material, carbon fiber, or the like.

The binder may be polyvinyl alcohol, carboxymethylcellulose/styrene-butadiene rubber, hydroxypropylene cellulose, diacetylene cellulose, polyvinylchloride, polyvinylpyrrolidone, polytetrafluoroethylene, polyvinylidene fluoride, polyethylene, polypropylene or the like, but the present invention is not limited thereto. The binder may be present in an amount of 1 to 30% by weight based on the total amount of the composition for forming the negative electrode active material layer.

Any conductive material may be used without particular limitation, as long as it has suitable conductivity without causing adverse chemical changes in the battery. Specifically, examples of the conductive material include: graphite such as natural graphite or artificial graphite; carbon black such as acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and conductive materials such as polyphenylene derivatives. The conductive material is typically added in an amount of 0.1 to 30% by weight based on the total weight of the composition for forming the negative electrode active material layer.

The positive electrode includes a positive electrode active material for a lithium secondary battery according to an embodiment. That is, the positive electrode may be produced by mixing the above-mentioned positive electrode active material, a binder and a conductive material to prepare a composition for forming a positive electrode active material layer and applying the composition to a positive electrode collector such as aluminum. In addition, a conductive material, a binder and the like are used, similar to the case of the above-mentioned negative electrode.

The electrolyte filling the lithium secondary battery may be a non-aqueous electrolyte, a known solid electrolyte or the like, and may be an electrolyte in which a lithium salt is dissolved.

The lithium salt may, for example, include at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiCl$, and $LiI$.

Examples of the solvent of the non-aqueous electrolyte include, but are not limited to: cyclic carbonates such as ethylene carbonate, propylene carbonate, butylene carbonate and vinylene carbonate; chain carbonates such as dimethyl carbonate, methyl ethyl carbonate and diethyl carbonate; esters such as methyl acetate, ethyl acetate, propyl acetate, methyl propionate, ethyl propionate and γ-butyrolactone; ethers such as 1,2-dimethoxyethane, 1,2-diethoxyethane, tetrahydrofuran, 1,2-dioxane and 2-methyltetrahydrofuran; nitriles such as acetonitrile; amides such as dimethylformamide, and the like. These may be used alone or in combination of two or more thereof. In particular, a solvent mixture of cyclic carbonate and chain carbonate is preferably used.

In addition, the electrolyte may be a gel-phase polymer electrolyte in which an electrolyte solution is impregnated into a polymer electrolyte such as polyethylene oxide or polyacrylonitrile, or an inorganic solid electrolyte such as $LiI$ or $Li_3N$.

The separator may be a sheet or non-woven fabric made of an olefin polymer such as polypropylene and/or a glass fiber or polyethylene, which have chemical resistance and hydrophobicity. When a solid electrolyte such as a polymer is employed as the electrolyte, the solid electrolyte may serve both as the separator and as the electrolyte.

BEST MODE

Now, the present invention will be described in more detail with reference to the following examples. These examples should not be construed as limiting the scope of the present invention.

EXAMPLES AND COMPARATIVE EXAMPLES

Comparative Example 1

$NiSO_4$ as a nickel precursor, $CoSO_4$ as a cobalt precursor and $MnSO_4$ as a manganese precursor were added in a molar ratio of 5:2:3 to water to prepare an aqueous nickel-cobalt-manganese hydroxide precursor solution.

An aqueous sodium hydroxide solution was slowly added dropwise thereto while stirring the aqueous precursor solution, and the reaction mixture was stirred for 5 hours to neutralize the precursor aqueous solution and to thereby precipitate $Ni_{0.50}Co_{0.20}Mn_{0.30}(OH)_2$ as a nickel-cobalt-manganese hydroxide.

The nickel-cobalt-manganese hydroxide thus obtained was mixed with $Li_2CO_3$ in a molar ratio of 1:1.03 and heat-treated at 940° C. for 18 hours to prepare a positive electrode active material.

Comparative Example 2

$Co_3O_4$ and $Li_2CO_3$ were mixed at a molar ratio of 1:1.040 ($Co_3O_4$:$Li_2CO_3$) and heat-treated at 1,000° C. for 8 hours to prepare a lithium cobalt oxide.

Comparative Example 3

500 ppm of $SiO_2$ as an Si additive was added to the positive electrode active material obtained in Comparative Example 1, followed by dry mixing and then heat treatment in a ceramic container at 400° C. for 12 hours to prepare a positive electrode active material coated with a Si component.

Example 1

A positive electrode active material was prepared in the same manner as in Comparative Example 1 except that the precursor composition was $Ni_{0.35}Co_{0.30}Mn_{0.35}(OH)_2$ and the Si additive was added at a specific ratio (500 ppm).

Example 2

A positive electrode active material was prepared in the same manner as in Comparative Example 2 except that the Si additive was added at a specific ratio (500 ppm).

Example 3

A positive electrode active material was prepared in the same manner as in Comparative Example 1 except that the precursor composition was $Ni_{0.38}Co_{0.29}Mn_{0.33}(OH)_2$ and the Si additive was added at a specific ratio (500 ppm).

Example 4

A positive electrode active material was prepared in the same manner as in Comparative Example 1 except that the precursor composition was $Ni_{0.50}Co_{0.20}Mn_{0.30}(OH)_2$ and the Si additive was added at a specific ratio (500 ppm).

Example 5

A positive electrode active material was prepared in the same manner as in Comparative Example 1 except that the precursor composition was $Ni_{0.60}Co_{0.20}Mn_{0.20}(OH)_2$, the Si additive was added at a specific ratio (500 ppm), LiOH was used, the temperature was 825° C. and firing was performed for 20 hours.

Example 6

A positive electrode active material was prepared in the same manner as in Comparative Example 1 except that the precursor composition was $Ni_{0.70}Co_{0.15}Mn_{0.15}(OH)_2$, the Si additive was added at a specific ratio (500 ppm), LiOH was used, the temperature was 820° C. and baking was performed for 30 hours.

Example 7

A positive electrode active material was prepared in the same manner as in Comparative Example 1 except that the precursor composition was $Ni_{0.50}Co_{0.10}Mn_{0.10}(OH)_2$, the Si additive was added at a specific ratio (500 ppm), LiOH was used, the temperature was 800° C. and baking was performed for 30 hours.

Table 1 below summarizes the differences between Examples and Comparative Examples and the results of DSC evaluation.

TABLE 1

| Item | Type of positive electrode active material core | Amount of added Si material (ppm) | Battery evaluation (4.3 V discharge capacity, mAh/g) | DSC (° C.) before coating | DSC (° C.) after coating | Baking temperature | Coating state | Whether or not reaction product is present at 300° C. |
|---|---|---|---|---|---|---|---|---|
| Comp. Ex. 1 | $Ni_{0.50}Co_{0.20}Mn_{0.30}$ | — | 170.0 | 332 | — | 940° C. | Non-coating | X |
| Comp. Ex. 2 | LCO | — | 158.2 | 266 | — | 1000° C. | Non-coating | X |
| Comp. Ex. 3 | $Ni_{0.50}Co_{0.20}Mn_{0.30}$ | — | 168.1 | 332 | 336 | 400° C. | Non-uniform coating | X |
| Ex. 1 | $Ni_{0.35}Co_{0.30}Mn_{0.35}$ | 500 | 160.5 | 273 | 279 | 940° C. | Uniform coating | O |
| Ex. 2 | LCO | 500 | 158.4 | 265 | 270 | 1000° C. | Uniform coating | O |
| Ex. 3 | $Ni_{0.38}Co_{0.29}Mn_{0.33}$ | 500 | 162.5 | 266 | 274 | 940° C. | Uniform coating | O |
| Ex. 4 | $Ni_{0.50}Co_{0.20}Mn_{0.30}$ | 500 | 169.0 | 332 | 345 | 940° C. | uniform coating | O |

TABLE 1-continued

| Item | Type of positive electrode active material core | Amount of added Si material (ppm) | Battery evaluation (4.3 V discharge capacity, mAh/g) | DSC (° C.) before coating | DSC (° C.) after coating | Baking temperature | Coating state | Whether or not reaction product is present at 300° C. |
|---|---|---|---|---|---|---|---|---|
| Ex. 5 | $Ni_{0.60}Co_{0.20}Mn_{0.20}$ | 500 | 180.0 | 263 | 270 | 825° C. | uniform coating | ○ |
| Ex. 6 | $Ni_{0.70}Co_{0.15}Mn_{0.15}$ | 500 | 193.7 | 246 | 251 | 820° C. | uniform coating | ○ |
| Ex. 7 | $Ni_{0.80}Co_{0.10}Mn_{0.10}$ | 500 | 213.0 | 225 | 229 | 800° C. | uniform coating | ○ |

Test Example

FIG. 1a is an SEM image showing a non-coated bare state of a positive electrode active material of Comparative Example 1.

FIG. 1b is an SEM image showing the state in which $Si_zO_a$ particles (agglomerates) are present between primary particles rather than being uniformly coated due to a low firing temperature (400° C.) in the positive electrode active material of Comparative Example 3.

FIG. 1c is an SEM image showing a uniformly coated state due to a high firing temperature (940° C.) in the positive electrode active material of Example 1.

As can be seen from FIG. 1c, the reaction-inducing substance is not identified due to the uniform coating.

FIG. 2a is EDX data obtained by analyzing the cross-sections of active material particles in the positive electrode active material of Comparative Example 3. As can be seen from FIG. 2a, almost no Si is detected inside the active material particles, and Si is detected only on the surface thereof in the positive electrode active material of Comparative Example 3.

FIG. 2b is EDX data obtained by analyzing the cross-sections of the active material particles in the positive electrode active material of Example 1. As can be seen from FIG. 2b, in the positive electrode active material of Example 1, Si is detected almost uniformly on the surface of and inside the active material particles.

FIG. 3a is an SEM image (X1,000) showing the state of a positive electrode active material not including a reaction-inducing substance at a temperature of 300° C. in the positive electrode active material of Comparative Example 1.

FIG. 3b is an SEM image (X5,000) showing the state of a positive electrode active material not including a reaction-inducing substance at a temperature of 300° C. in the positive electrode active material of Comparative Example 1.

As can be seen from FIGS. 3a and 3b, the positive electrode active material not including the reaction-inducing substance does not form a reaction product even when exposed to high temperatures, so that the gap between the positive electrode active material particles (CA) is empty.

FIG. 3c is an SEM image (X1,000) showing the state of a positive electrode active material including a reaction-inducing substance at a temperature of 300° C. in the positive electrode active material of Example 1.

FIG. 3d is an SEM image (X5,000) showing the state of a positive electrode active material including a reaction-inducing substance at a temperature of 300° C. in the positive electrode active material of Example 1.

As can be seen from FIGS. 3c and 3d, when the positive electrode active material including the reaction-inducing material is exposed to a high temperature of 300° C., small particles of reaction products (PM) are formed and dispersed between the positive electrode active material particles (CA).

FIG. 3e is an SEM image (X1,000) showing the state of a positive electrode active material including the reaction-inducing substance in the positive electrode active material of Example 1 at a temperature of 380° C.

FIG. 3f is an SEM image (X5,000) showing the state of a positive electrode active material including a reaction-inducing substance in the positive electrode active material of Example 1 at a temperature of 380° C.

As can be seen from FIGS. 3e and 3f, when the positive electrode active material including the reaction-inducing substance is exposed to a high temperature of 380° C., the small particles of reaction products (PM) agglomerate and are converted into one larger particle and the agglomerated reaction products (PM) are located in the form of independent particles between the positive electrode active material particles (CA).

As shown in FIGS. 3c to 3f and Table 1, in the cathode active materials of Comparative Examples 1 to 3, the reaction product of the non-conductor does not exist at 300° C., but in all of the cathode active materials of Examples 1 to 7, the reaction product of the non-conductor exists. The reaction product of the non-conductor formed on the positive electrode active material at a high temperature such as 300° C. acts as an electrical and metabolic resistor to shut down the secondary battery and thereby prevent thermal runaway, and also acts as a thermal resistor to inhibit the physical and chemical collapse and rapid reaction of the elements of the secondary battery, to thereby improve the thermal safety of the secondary battery.

In addition, it can be seen that, regarding the positive electrode active materials of Examples 1 to 7, as the temperature increases from 300° C. to 380° C., the volume of the reaction product increases and the effect as a metabolic resistor can be further enhanced. The property whereby the volume of the reaction product increases with increasing temperature at high temperatures can further enhance the effects of the electrical, thermal and metabolic resistor described above.

Meanwhile, as can be seen from FIGS. 3d and 3f, the reaction products (PM) of the non-conductor may be in contact with the outer surface of the positive electrode active material particles (CA) while maintaining independent particles distinguished from the positive electrode active material particles (CA). That is, it can be seen that as the temperature reaches a high level, the reaction-inducing substance is separated from the positive electrode active material particles (CA) while forming the reaction products (PM).

FIG. 4a is EDS data obtained by analyzing the components of a polymer formed at 300° C. for the positive electrode active material of Example 1. At this time, it can be seen that the polymer includes Si, P, O and F.

FIG. 4b is EDS data obtained by analyzing the components of the polymer formed at 380° C. for the positive electrode active material of Example 1. At this time, it can be seen that the polymer includes Si, P, O and F.

FIG. 5 is a diagram showing an expected mechanism of polymerization according to an embodiment of the present invention. This is only one example, and the polymer is expected to be produced through a variety of mechanisms.

As can be seen from FIGS. 4a and 4b along with FIG. 5, the reaction-inducing substance forms a reaction product in the form of a polymer, together with an electrolyte and/or a binder, and the molecular weight of the polymer increases with increasing temperature.

The present invention is not limited to the above embodiments, but may be implemented in various forms, and those skilled in the art to which the present invention pertains will appreciate that the present invention can be implemented as other specific embodiments without changing the technical spirit or essential features of the present invention. It should be understood that the embodiments described above are not restrictive but exemplary in all respects.

The invention claimed is:

1. A secondary battery comprising:
a positive electrode;
a negative electrode; and
an electrolyte,
wherein the secondary battery further comprises a reaction-inducing substance located in any one of the positive electrode, the negative electrode and the electrolyte,
wherein the reaction-inducing substance forms a reaction product as a non-conductor when exposed to a predetermined temperature or higher in a use environment of the secondary battery,
wherein the reaction product is a non-conductor, and
wherein the reaction-inducing substance comprises Li and Si.

2. The secondary battery according to claim 1, wherein the reaction-inducing substance forms the reaction product by reacting with at least one of the electrolyte and a binder in the secondary battery.

3. The secondary battery according to claim 1, wherein as a temperature increases, a size of the reaction product increases.

4. The secondary battery according to claim 1, wherein the reaction-inducing substance comprises a compound represented by Formula 1 below:

$$Li_xM_ySi_{z-y}O_{a-b}A_b \qquad (1)$$

wherein $0<x\leq4$, $0\leq y\leq1$, $0<z\leq1$, $y<z$, $0\leq a\leq4$, $0\leq b\leq4$, and $b<a$, M is at least one of Ni, Mn, Co or Al, and A is at least one of Cl or F.

5. The secondary battery according to claim 4, wherein the reaction-inducing substance comprises both $SiO_2$ and the compound of Formula 1, and a molar ratio of $[SiO_2]/$[compound of Formula 1] is 0.8 or less.

6. The secondary battery according to claim 1, wherein the reaction product is a polymer.

7. The secondary battery according to claim 6, wherein the polymer comprises at least one of Si, P, O or F.

8. The secondary battery according to claim 1, wherein the reaction-inducing substance is disposed in a positive electrode active material and the reaction product is formed and disposed as an independent particle between particles of the positive electrode active material.

9. An active material comprising:
a lithium metal oxide; and
a reaction-inducing substance,
wherein the reaction-inducing substance forms a reaction product when exposed to a predetermined temperature or higher in a use environment of a secondary battery,
wherein the reaction product is a non-conductor, and
wherein the reaction-inducing substance comprises Li and Si.

10. The active material according to claim 9, wherein the reaction-inducing substance is disposed on a surface of the lithium metal oxide.

11. The active material according to claim 9, wherein the lithium metal oxide is in a form of primary particles and secondary particles including the primary particles, and
the reaction-inducing substance is present inside and/or on a surface of the secondary particles.

12. The active material according to claim 11, wherein, in a cross-section of the secondary particles, upon EDX analysis of any 20 or more pores, Si is detected in 50% or more of analyzed pores based on 100% of a total number of pores analyzed.

* * * * *